US010354497B2

(12) United States Patent
Comeau

(10) Patent No.: US 10,354,497 B2
(45) **Date of Patent: *Jul. 16, 2019**

(54) GAMING DEVICE WITH SHIFTING REPLACEMENT SYMBOLS

(71) Applicant: IGT CANADA SOLUTIONS ULC, Moncton (CA)

(72) Inventor: Brian Comeau, Memramook (CA)

(73) Assignee: IGT CANADA SOLUTIONS ULC, Moncton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/942,803

(22) Filed: Apr. 2, 2018

(65) Prior Publication Data

US 2018/0232999 A1 Aug. 16, 2018

Related U.S. Application Data

(63) Continuation of application No. 14/302,217, filed on Jun. 11, 2014, now Pat. No. 9,940,794.

(51) Int. Cl.

| | |
|---|---|
| ***A63F 9/24*** | (2006.01) |
| ***A63F 13/00*** | (2014.01) |
| ***G06F 17/00*** | (2019.01) |
| ***G06F 19/00*** | (2018.01) |
| ***G07F 17/34*** | (2006.01) |
| ***G07F 17/32*** | (2006.01) |

(52) U.S. Cl.

CPC .......... *G07F 17/34* (2013.01); *G07F 17/3265* (2013.01)

(58) Field of Classification Search

USPC .......................................... 463/22, 25, 37, 39

See application file for complete search history.

(56) References Cited

U.S. PATENT DOCUMENTS

| | | | |
|---|---|---|---|
| 5,766,079 | A | 6/1998 | Kataoka et al. |
| 6,722,985 | B2 | 4/2004 | Criss-Puszkiewicz et al. |
| 6,908,387 | B2 | 6/2005 | Hedrick et al. |
| 6,913,534 | B2 | 7/2005 | DeFrees-Parrott et al. |
| 7,147,559 | B2 | 12/2006 | Englman |
| 7,226,359 | B2 | 6/2007 | Bussick et al. |
| 7,311,605 | B2 | 12/2007 | Moser |
| 7,470,183 | B2 | 12/2008 | Wishart |

(Continued)

FOREIGN PATENT DOCUMENTS

| | | |
|---|---|---|
| GB | 2258334 A1 | 2/1993 |

*Primary Examiner* — Adetokunbo O Torimiro

(74) *Attorney, Agent, or Firm* — Sage Patent Group

(57) ABSTRACT

A video slot machine has M reels, each displaying N symbols when stopped. Above the display of the reels is a set of generally valuable replacement symbols that have been independently selected at random independent from the reel display. Each reel is associated with a particular replacement symbol in the set. If a special symbol is displayed on a reel, the replacement symbol associated with that reel substitutes for the special symbol when determining the award. Examples of the replacement symbols include wild symbols, bonus symbols, and multiplier symbols. After each game, the replacement symbols are shifted, and used replacement symbols are randomly replaced to vary the possibilities for each game. The player is incentivized to play longer due to the possibility of using valuable replacement symbols in the symbol array and the possibility of very high awards being granted by multiple special symbols being displayed.

20 Claims, 3 Drawing Sheets

(56) References Cited

U.S. PATENT DOCUMENTS

| | | | |
|---|---|---|---|
| 7,563,163 | B2 | 7/2009 | Crumby |
| 7,585,223 | B2 | 9/2009 | Iddings et al. |
| 7,597,624 | B2 | 10/2009 | Tetterington et al. |
| 7,611,411 | B2 | 11/2009 | Griswold et al. |
| 7,617,151 | B2 | 11/2009 | Rowe |
| 7,651,392 | B2 | 1/2010 | Pennington et al. |
| 7,666,093 | B2 | 2/2010 | Lafky et al. |
| 7,731,581 | B2 | 6/2010 | Chamberlain et al. |
| 7,753,774 | B2 | 7/2010 | Gail et al. |
| 7,780,523 | B2 | 8/2010 | Baerlocher et al. |
| 7,833,092 | B2 | 11/2010 | Wolf et al. |
| 7,905,778 | B2 | 3/2011 | Breckner et al. |
| 7,950,994 | B2 | 5/2011 | Berman et al. |
| 7,955,170 | B2 | 6/2011 | Gail et al. |
| 8,012,011 | B2 | 9/2011 | Baerlocher et al. |
| 8,016,656 | B2 | 9/2011 | Berman et al. |
| 8,057,298 | B2 | 11/2011 | Nguyen et al. |
| 8,070,578 | B2 | 12/2011 | Michaelson et al. |
| 8,070,579 | B2 | 12/2011 | Bienvenue et al. |
| 8,070,583 | B2 | 12/2011 | Baerlocher et al. |
| 8,128,492 | B2 | 3/2012 | Vasquez et al. |
| 8,137,179 | B2 | 3/2012 | Jensen et al. |
| 8,241,104 | B2 | 8/2012 | Wolf |
| 8,337,298 | B2 | 12/2012 | Baerlocher |
| 8,398,472 | B2 | 3/2013 | Bansemer et al. |
| 8,430,739 | B2 | 4/2013 | Rodgers |
| 8,500,538 | B2 | 8/2013 | Warner et al. |
| 8,500,548 | B2 | 8/2013 | Baerlocher et al. |
| 8,517,814 | B2 | 8/2013 | Visser |
| 8,562,423 | B2 | 10/2013 | Wolf et al. |
| 8,616,956 | B2 | 12/2013 | Englman et al. |
| 8,968,071 | B2 | 3/2015 | Tessmer et al. |
| 9,754,457 | B2 | 9/2017 | Meyer |
| 9,786,116 | B2 | 10/2017 | Saunders |
| 2005/0148382 | A1 | 7/2005 | Fox |
| 2009/0123364 | A1 | 5/2009 | Forsyth et al. |
| 2009/0305770 | A1 * | 12/2009 | Bennett .................. G07F 17/32 463/20 |
| 2013/0095907 | A1 * | 4/2013 | Allon .................. G07F 17/3265 463/20 |
| 2013/0273997 | A1 | 10/2013 | Stewart |
| 2014/0038690 | A1 * | 2/2014 | Meyer ................ G07F 17/3267 463/20 |
| 2015/0356828 | A1 | 12/2015 | Caputo et al. |

* cited by examiner

GAMING DEVICE WITH SHIFTING REPLACEMENT SYMBOLS

CROSS REFERENCE TO RELATED APPLICATIONS

The present application is a continuation of U.S. patent application Ser. No. 14/302,217, filed Jun. 11, 2014, entitled "GAMING DEVICE WITH SHIFTING REPLACEMENT SYMBOLS", the disclosure of which is incorporated herein in its entirety as set forth herein.

FIELD OF THE INVENTION

This invention relates to gaming devices, such as video slot machines displaying virtual reels, and, in particular, to a special game feature in a video slot machine where original symbols on the reels are temporarily replaced by feature symbols.

BACKGROUND

Common video slot machines randomly select and display an array of symbols using virtual reels, then grant an award to a player based on the occurrence of certain symbol combinations across paylines. Typically, the game ends after a single spin of the reels and any award is granted. There is no particular feature in such a game that draws the player into playing longer, since the game opportunities are identical from game to game.

What is desirable, for both the player and the casino owner, is a game played on a video slot machine that effectively varies the game, from game to game, and provides added incentive for a player to keep playing. The game should also convey to the player that a large award is possible for each game. Such a gaming machine will generate increased revenue to the casino by increased play of the gaming machine.

SUMMARY

One embodiment of the present invention may be implemented by a conventional-platform video slot machine that is suitably programmed. The invention can also be implemented by a home computer playing a slot machine type game, or by any personal computing device, such as a smartphone, connected to a wireless network such as the Internet.

Various embodiments of the game are described. In one embodiment, a video slot machine has five vertically oriented reels, each displaying three symbols per reel when randomly stopped. Other size arrays may also be used. During a game, some or all of the reels include a special symbol, where the display of a special symbol on one or more reels triggers the below-described feature.

Displayed in a second display area, such as above the display of the reels, is an ordered array of replacement symbols. In one embodiment, the replacement symbols include five replacement symbols positioned in a single row, where each replacement symbol is associated only with a particular reel. The replacement symbols in the set are selected randomly independent of the reel display. Examples of the replacement symbols include award multipliers, wild symbols, full reel wild symbols, instant credit awards, bonus game triggers, and a mystery award. The player sees the values of all the replacement symbols in the second display area so anticipates their eventual use.

When a special symbol is randomly displayed on a stopped reel in the base game, the replacement symbol associated with that reel replaces the special symbol. In one embodiment, the special symbols on the reel strips are arrange so that there is a maximum of one special symbol that can be displayed per reel.

After the replacement of the special symbols, an award is granted to the player for all winning combinations of symbols, including the replacement symbols. After the award is granted, the reel strips revert to their original symbol arrangements.

Since there is a possibility that each reel may display a special symbol, and the replacement symbols may include wild symbols and award multiplier symbols, the player is aware of the possibility of a very high award being granted.

In one embodiment, the special symbols have no value other than to be replaced by a replacement symbol. In another embodiment, the special symbols have some value when combined with other symbols in the array, such as causing an instant award to be granted for a combination of the special symbols prior to the special symbols being replaced with the replacement symbols.

After all awards have been paid, the game is over.

After the replacement symbols have been used to replace the displayed special symbols, there will be gaps in the displayed set of replacement symbols. The remaining replacement symbols shift to fill in the gaps, and additional replacement symbols are added to complete the set of displayed replacement symbols. When the player makes another wager and prior to the spinning of the reels for the new game, the replacement symbol that occupied the rightmost position in the row is shifted out of the second display area, the remaining replacement symbols shift, and a new replacement symbol is introduced to complete the set. In this way, the replacement symbols change from game to game, and the player will always have a chance of using any displayed replacement symbols. The new replacement symbols are selected at random, such as by weighted probabilities. By weighting the probabilities for the selection of the replacement symbols, very valuable replacement symbols may be infrequently added, which adds excitement and causes the player to play until at least the most valuable replacement symbols have been shifted out of the second display area.

Even if no replacement symbols are used in a game, the replacement symbols still shift out of the display area by one position each game, where the rightmost replacement symbol shifts off the screen, and a new replacement symbol enters the row from the left side. This varies the possibilities of awards to the player for every game and adds excitement.

In another embodiment, there are three rows of replacement symbols, where each row contains five replacement symbols, one for each of the five reels. Only the bottom row is used to replace the special symbols in a single game. The same steps are used as described above for filling in any gaps in the replacement symbol array and shifting out the rightmost replacement symbol before the next game. New replacement symbols are shifted in from the leftmost position of the top row.

Therefore, the player sees the next 15 replacement symbols that may potentially substitute for a displayed special symbol, and the player will want to continue playing to at least utilize any particularly valuable replacement symbol.

In one embodiment, the same replacement symbol array is displayed to the player irrespective of the player's wager.

Since the displayed set of replacement symbols do not become completely erased from game to game, and the values of at least the instant award replacement symbols should reflect the particular wager amount to incentivize the player to place the highest wagers, another embodiment of the gaming machine presents a stored different set of replacement symbols for each wager value. For example, if the player is wagering the minimum of one cent per payline per game, the replacement symbols will be randomly selected from a pool of replacement symbols associated with that wager, which will generally be the lowest value replacement symbols. Therefore, each time the player wagers one cent per payline, that associated set of replacement symbols will be displayed to the player. If the player is wagering the maximum of a nickel per payline per game, a set of replacement symbols stored after the previous game played with a nickel per payline wager is displayed to the player, where the replacement symbol values are generally higher than those used for the one cent per payline wager. For each wager amount, the operation of the feature game will be identical. Typically, a player consistently wagers the same amount, so the feature game will flow continuously.

As seen, the feature adds another level of excitement to the conventional video slot machine game, and the player will typically play longer in order to make use of particularly valuable replacement symbols displayed in the second display area.

Other embodiments are described.

BRIEF DESCRIPTION OF THE DRAWINGS

Elements that are the same or similar are designated with the same numeral in the various figures.

DETAILED DESCRIPTION

Although the invention can typically be implemented by installing a software program in most types of modern video gaming machines, one particular gaming machine platform will be described in detail.

Figure 1:
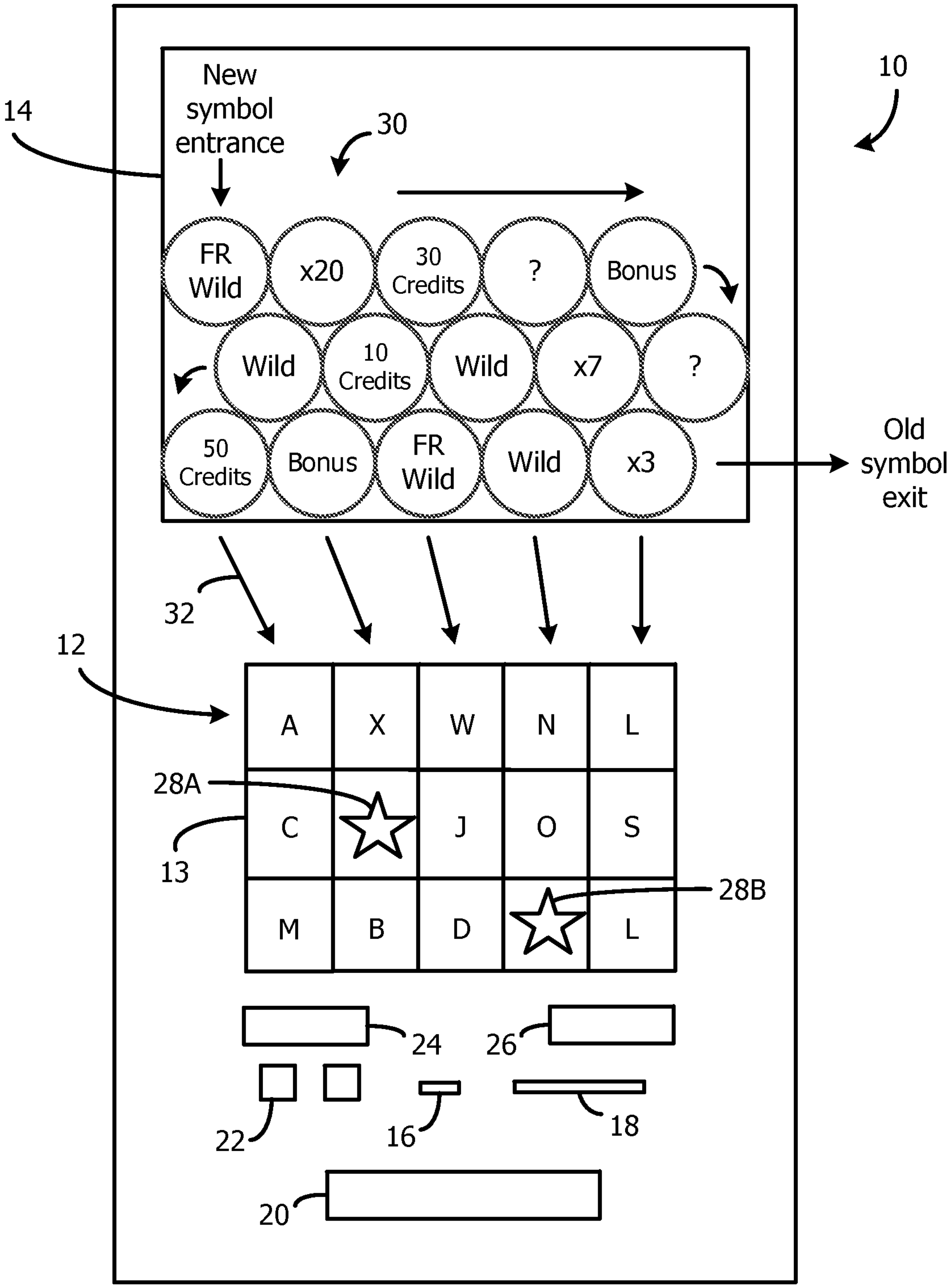
FIG. 1 illustrates a gaming machine that is displaying an originally selected array of symbols prior to any symbols being replaced pursuant to the feature game, and displaying a set of replacement symbols in a top display area, in accordance with one embodiment of the present invention.

FIG. 1 illustrates a video gaming machine 10 that includes a main display, which is a bottom display 12 in the example (or bottom display area). The main display may be a thin film transistor (TFT) display, a liquid crystal display (LCD), a cathode ray tube (CRT), or any other type of display. In FIG. 1, the base game shown in the display 12 is a 3×5 matrix of virtual symbol reels 13, where each reel 13 displays three symbols when stopped. An award is granted, by a processor, based on symbol combinations across activated paylines, such as horizontal and zig-zag paylines. In one embodiment, bets above the minimum bet activate additional paylines and/or increase the payout for each winning combination. In another embodiment, all paylines are activated with a single bet, and the awards are multiplied proportional to the amount bet. In one embodiment, there are 30 paylines, which are all activated each game. The base game can involve any size array of reels. A minimum size should be a 3×3 array.

A secondary display, which is a top display 14 in the example or top display area of a large screen, displays a special feature portion of the base game, described later. The top display 14 is used to communicate to the player outcome possibilities for the current spin and future spins.

A coin/token receiver 16 accepts coins or tokens in one or more denominations to generate credits within the machine 10 for playing games. An input slot 18 accepts various denominations of banknotes or machine-readable tickets, and may output printed tickets for use in cashless gaming. A coin tray 20 receives coins or tokens from a hopper upon a win or upon the player cashing out. Player control buttons 22 include any buttons needed for the play of the games offered by the machine 10 including, for example, a bet button, a max-bet button, a spin reels button, a cash-out button, and any other suitable button. Pressing the bet button multiple times multiplies the bet. Buttons 22 may be replaced by a touch screen with virtual buttons.

Each bet deducts credits from a credit meter 24 that stores the accumulated credits from wins and the insertion of money. If the player cashes out, all the credits in the credit meter 24 are paid to the player. A game win meter 26 identifies the amount won for the present game.

All credit meters, all control buttons, and the entire game may be displayed on a single large touch screen.

FIG. 1 illustrates an arbitrary, randomly selected symbol array determined by the five virtual reels spinning and randomly stopping during a base game. The virtual reel strips may contain any conventional symbols in the conventional aspect of the game. Such conventional symbols are denoted by letter symbols at the various symbol positions. Such conventional symbols may also include wild symbols, scatter symbols, and other types of known symbols. The stopping position of each reel is determined by a pseudo-random number generator in the machine 10.

Each reel strip also contains one or more special symbols, which are represented in FIG. 1 as a star symbol, such as star symbols 28A and 28B. Although two star symbols are displayed in FIG. 1, anywhere from zero to five star symbols can be randomly displayed. In the preferred embodiment, the star symbols on a reel (if more than one) are arranged so that only one star symbol per reel can be displayed.

In the top display 14, an ordered array of replacement symbols 30 is shown so the player may see the current and upcoming possible replacement symbols. Although the replacement symbols 30 are shown as three rows of five symbols per row, only the bottom row is applicable for the present game. Therefore, the upper rows are optional but increase the incentive for the player to keep playing.

Initially, upon the machine 10 powering up, the 15 replacement symbols 30 are pseudo-randomly selected, by a processor associated with the machine 10, from a pool of possible replacement symbols. The selection may be weighted so that very valuable replacement symbols are infrequently selected relative to the less valuable replacement symbols. In one embodiment, the display of the replacement symbols 30 continues even after a player cashes out to prevent players from attempting to improve the displayed replacement symbols by repeatedly cashing out.

Prior to the spinning of the reels for a new game, such as when the player presses the “spin reels” or “play” button to play the next game, the bottom rightmost replacement symbol 30 is removed, and a new replacement symbol 30 enters from the left of the top row. In this way, the set of replacement symbols shifts at least one position from game to game even if no replacement symbols are used in a game. Such shifting of the replacement symbols may be controlled by a processor associated with the machine 10.

Each of the five replacement symbols 30 in the bottom row is directly associated with a particular reel, as shown by the arrows 32. When a star symbol (e.g., symbol 28A) appears on any reel in the base game, the corresponding replacement symbol 30 replaces that star symbol prior to the awards being granted. Therefore, as many as five of the replacement symbols 30 may be used in the symbol array when evaluating the awards.

In one embodiment, the replacement symbols 30 include the following:

An award multiplier symbol (e.g., ×3) that multiples all awards for the game by the displayed multiplier value. If more than one multiplier is in the array, the awards are multiplied by the product of the multipliers. In another embodiment, the award is only multiplied by the highest of the multipliers or by a sum of the multipliers.

A wild symbol that serves as any symbol to grant the highest award for a symbol combination along the associated payline.

A full reel wild symbol (FR wild) that causes the reel to display three wild symbols.

A bonus symbol that awards a number of successive free games, such as 10 free games, when three or more bonus symbols appear in the symbol array. The bonus symbol may identify different numbers of free games. The bonus symbol may also be used to trigger any type of special bonus game after the base game.

An instant credit symbol that awards the credits identified by the symbol.

A mystery symbol (e.g., ?) that may be any of the feature symbols or another type of high value symbol.

In one embodiment, the star symbol on the reel strips cannot be combined with other symbols to create a winning combination. In another embodiment, the start symbols can be combined to create a winning combination for an award prior to the star symbols being replaced by the replacement symbols.

The reel strips may also include any symbol that is in common with a replacement symbol, such as a wild symbol or a bonus symbol.

After the replacement symbols have replaced the displayed special symbols, the gaps left by the used replacement symbols are filled in by the replacement symbols shifting toward the "exit" position, and new replacement symbols are added from the "entrance" position. Therefore, the player now sees a full set of replacement symbols, and the very high value replacement symbols provide an incentive to keep playing.

Figure 2:
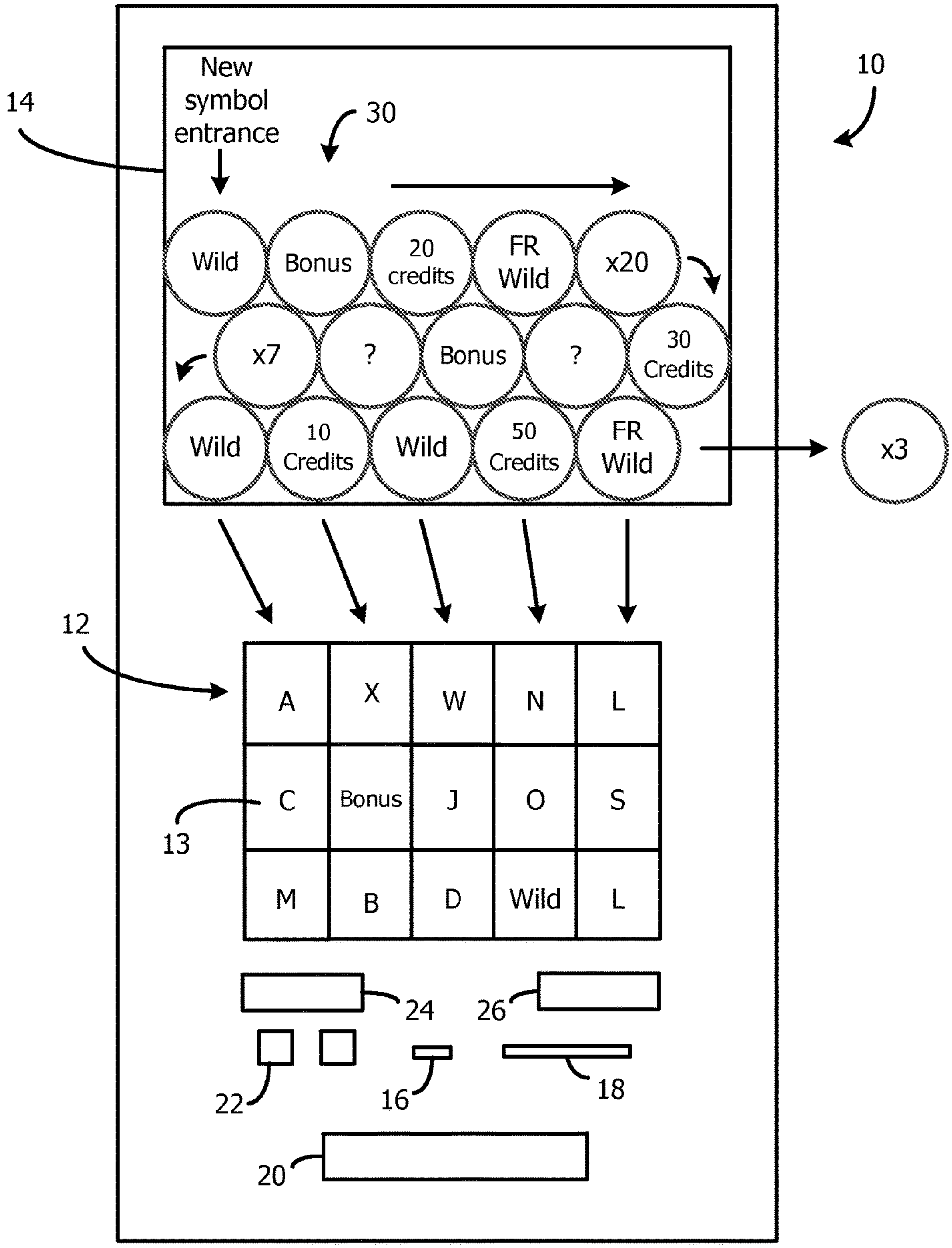
FIG. 2 illustrates the same game as in FIG. 1 but after displayed special symbols have been replaced by replacement symbols from the top display area.

FIG. 2 shows how the star symbols 28A and 28B in FIG. 1 have been replaced with the corresponding replacement symbols (bonus and wild) in the top display 14 of FIG. 1 and how the replacement symbols have been shifted in a serpentine manner to fill in the three rows of replacement symbols. The two gaps in the array of replacement symbols are filled in by two new replacement symbols, 20 credits and Bonus, at the top left.

The award to the player for the game is based on the final symbol array in the display 12 that includes the replacement symbols. A paytable typically determines the award. After the award is granted, the reel strips revert to their original symbol arrangements, and the used replacement symbols are extinguished. FIG. 2 also illustrates how the rightmost replacement symbol (a ×3 multiplier symbol) has been shifted out of the display 14 and a new replacement symbol (a wild symbol) is added to the display 14 from the top leftmost position after the player initiated the next game by wagering a certain amount and pressing the "spin reels" or "play" button. The shifting occurs prior to the reels spinning and stopping. Thus, prior to reels spinning, the player sees the new full set of replacement symbols.

The player thus has the possibility of using any of the displayed replacement symbols if the player plays long enough. The shifting of the replacement symbols may occur any time after an award is granted. It is preferred that the replacement symbols shift the one position only after the player makes a wager for the next game to add more excitement and unpredictability to each new game.

The machine 10 then initiates the spin of the reels for the next base game, and the process repeats.

As seen, the player is invested in playing longer if the player perceives the top display 14 as displaying particularly valuable replacement symbols. Further, the replacement symbols are shifted for each game so the opportunities are constantly changing, which adds further excitement. Additionally, there is a possibility for a very high award to be granted if multiple star symbols (special symbols) are displayed at the same time since the resulting array of symbols after the replacement may include several wild symbols and award multipliers.

In one embodiment, the same replacement symbol array is displayed to the player irrespective of the player's wager.

Since the value of the replacement symbols should be related to the wager amount to reward players that wager above the minimum bet, in another embodiment of the invention a different set of replacement symbols is stored in the machine 10 for each wager amount. For example, for a one cent/payline wager, a first set of stored replacement symbols is displayed in the top display 14 that has been generated pursuant to past games played with a one cent/payline wager. For a five cent/payline wager, a second set of stored replacement symbols is displayed in the top display 14 that has been generated pursuant to past games played with a five cent/payline wager. This aspect will not be distracting to the player since the player typically plays with the same wager from game to game.

Figure 3:
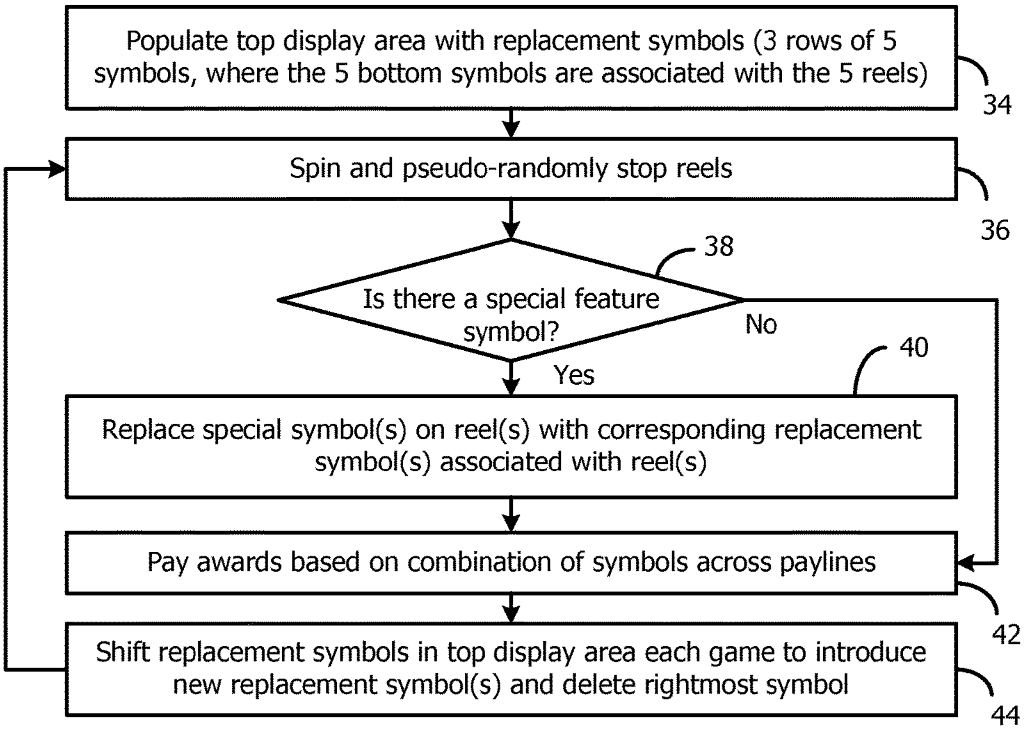
FIG. 3 is a flowchart of various steps used in carrying out the game of FIGS. 1 and 2.

FIG. 3 is a flowchart illustrating a method that may be performed by a processor associated with the gaming machine 10. For example, the processor of a game controller board 50 (FIG. 4) may be configured to perform the method of FIG. 3. More particularly, processor-executable instructions are stored in memory associated with the machine 10, such as game control memory. Such instructions are readable by the processor and these instructions configure the processor to perform the method of FIG. 3. The instructions may also be referred to as code.

In step 34, such as upon powering up of the machine 10 (which may be detected by the processor), the processor configures a secondary display of the machine, such as the top display 14, or top area of a single large display, to be populated with the replacement symbols 30, where five replacement symbols directly correspond to the five reels. The replacement symbols that are generated at step 34 may also be stored in memory associated with the machine 10.

The player then makes a wager and spins the reels. More particularly, input is received at the processor directing the processor to make a wager and spin the reels. The processor then initiates the spinning of the reels. The reels are then randomly stopped by the processor in step 36 to display a 3×5 array of symbols on the original reel strips. A random number generator, which may be associated with the processor, determines the stopping positions.

In step 38, processing circuitry (e.g. the processor) in the machine 10 determines if any special symbols (e.g., star symbols) are in the displayed array. If so then, in step 40, the special symbols are replaced with the associated replacement symbols.

In step 42, a pay table is then used, by a processor, to determine the award for any winning symbol combinations across the paylines, including multiplied awards. The player is then issued the appropriated amount of credits on a credit meter. After the award is granted, the reel strips revert to their original symbol arrangements.

In step 44, the replacement symbols in the secondary display (e.g. the top display) are shifted, by the processor, to fill in the gaps from certain replacement symbols being used, and new replacement symbols are added to complete the set of replacement symbols. Prior to the spinning of the reels for the next game, the replacement symbols are shifted, by the processor, one position to delete the rightmost replacement symbol and add another replacement symbol to the set. In another embodiment, if the rightmost replacement symbol had been used to replace a star symbol, no additional replacement symbol is shifted out of the top display. Such shifting may be performed by retrieving, from the memory, the set of replacement symbols that were generated at step 34 and by shifting that set (e.g. in a serpentine manner). The new replacement symbols (i.e. the replacement symbols after the shifting) may be displayed on the secondary display and may be stored in the memory.

The player may then play the next game with the new arrangement of replacement symbols. Thus, the secondary display permits a user to view the replacement symbols that are "in play" for the next spin. Since the shifting is performed after each spin, the secondary display also permits a user to view the replacement symbols that are "in play" for subsequent spins.

The game may be played with any number of reels and symbol positions, including a 3×3 array.

In traditional slot machines, there is no variation in the set of possible outcomes from spin to spin. In contrast, the gaming devices and methods described herein vary the set of possible outcomes from game to game, by changing the set of applicable replacement symbols, and convey these changing possible outcomes, and future possible outcomes, to the player to add excitement to the playing experience.

Figure 4:
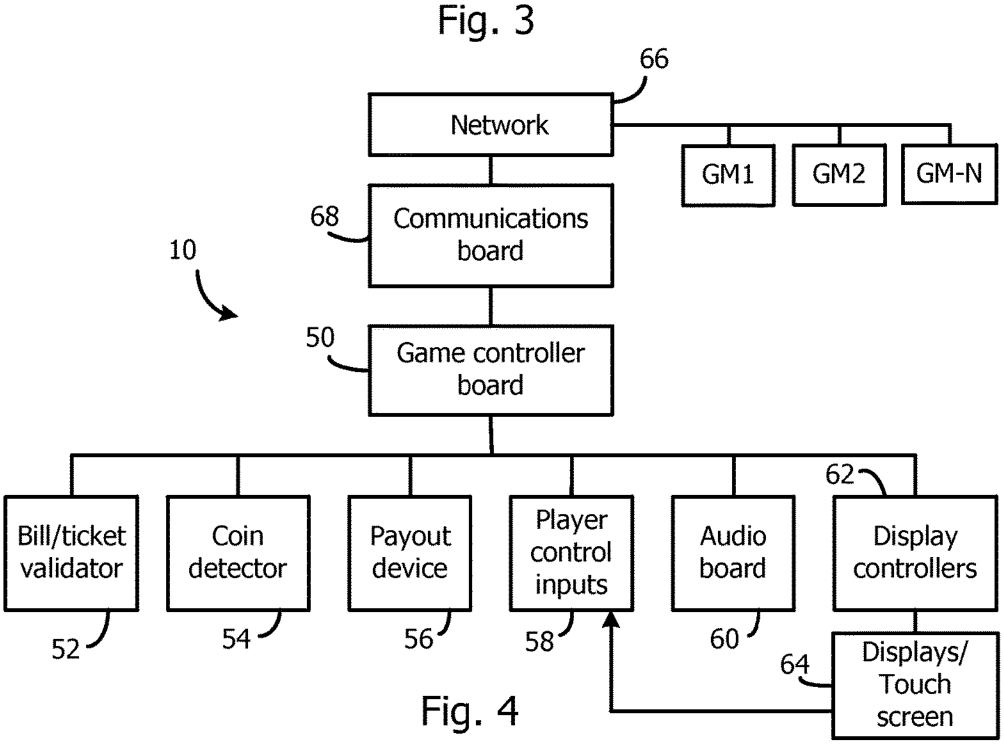
FIG. 4 is a block diagram illustrating various functional units in a gaming machine, where the machine is programmed to carry out the invention.

FIG. 4 illustrates basic circuit blocks in the machine 10 of FIG. 1 and portions of a network. A game controller board 50 includes a processor (CPU), or multiple processors, that runs the gaming program (including any or all aspects of the present game) stored in a game control memory which may be a program read only memory (ROM), such as a compact disk (CD). That is, the game control memory stores code for directing the processor to execute game operations including, for example, the operations described with reference to FIG. 3. The processor associated with the game controller board 50 may include a single processor or a plurality of processors. The program ROM may include a pseudo-random number generator program for selecting symbols and for making any other random selections. That is, pseudo random number generator code may be stored in the game control memory and may be executed by the processor to select symbols and make other random selections. At least the active portion of the gaming program may be stored in a random access memory (RAM) on the board 50 for access by the processor system. A paytable ROM on the board 50 detects the outcome of the game and identifies awards to be paid to the player.

A memory included in the machine 10 is used to store data regarding replacement symbols. This memory may, for example, be the same memory that stores the gaming program (i.e., it may be the game control memory), or it may be a different memory component. The memory storing the data regarding replacement symbols is coupled with the processor to allow the processor to access the memory and to use such data when determining the outcome of a spin and also to allow the replacement symbols defined in a given play to affect the replacement symbols used in a subsequent play (e.g. since replacement symbols are shifted following a play). A bill/ticket validator 52 and coin detector 54 add credits for playing games. A payout device 56 pays out an award to the player in the form of coins or a printed ticket at the end of a game or upon the player cashing out. Player control inputs 58 receive push-button or touch screen inputs for making player selections. An audio board 60 sends signals to the speakers. A display controller 62 receives commands from the processor or network and generates signals for the various displays 64.

Modern gaming machines are connected within a network for remote monitoring of the machines. The game controller board 50 transmits and receives signals to and from a network 66 via a communications board 68. The network 66 includes servers and other devices that monitor the linked gaming machines 10 and GM1-GM-N.

The electronics on the various boards may be combined onto a single board. Various functional units would be deleted for cashless gaming.

The gaming system has been described above as a dedicated physical gaming machine in a casino or other establishment. However, the gaming machine 10 may be a suitable generic computer or mobile device (smartphone, tablet, etc.) connected to a network/server via the internet and programmed to carry out the inventive methods. The gaming machine 10 of FIG. 1 may itself be a screen image in a virtual casino. Icon selection may be by touch screen, a mouse, a joystick, or other means. The gaming system may access a gaming site or a social website (e.g., Facebook) via the internet, wherein the remote gaming site controls various aspects of the game and allows remote players to participate in games using a virtual gaming machine. The player's inputs may be transmitted to a remote server and the results displayed to the player's display screen. For example, a player's mobile computing system (e.g., a smartphone) may detect winning symbol combinations by signals from the server informing the computing system that a winning combination has occurred. For gaming via the internet, the wagering would typically be by credit card or accessing an existing account. Awarding the player may be by crediting the player's account. For portable computing devices, Near Field Communications (NFC), such as Bluetooth, may be used as a player interface to play on an actual or virtual gaming machine 10.

Those skilled in the art may write the appropriate software to carry out the invention without undue experimentation. The hardware used may be conventional.

The term "random" used herein refers to pure random as well as pseudo-random.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention. For example, the bonus trigger may be any symbols combination and only award one free game. Any of the features described herein may be combined into a game.

What is claimed is:

1. A method performed by a video gaming device including at least a processing system, a display system coupled to the processing system, and an acceptor, the method comprising:

receiving, by the acceptor, a physical item having a monetary value associated with the received physical item;

receiving, by the processing system, a wager;

in response to receiving the wager, displaying on the display system a plurality of game symbols at a plurality of game symbol display positions to form an outcome, wherein the plurality of game symbols are randomly determined, wherein the game symbol display positions comprise a plurality of subsets of game symbol display positions, and wherein the plurality of game symbols comprise a special symbol displayed in a first one of the game symbol display positions;

displaying on the display system a set of replacement symbols concurrently with and separate from the plurality of game symbols, the set of replacement symbols being randomly determined and comprising a plurality of different replacement symbols arranged in an ordered set of replacement symbol display positions, wherein the ordered set of replacement symbol display positions includes an entry position and an exit position, and wherein each of the plurality of subsets of game symbol display positions is associated with a corresponding replacement symbol display position;

substituting, under control of the processing system, the special symbol displayed on the outcome with a first replacement symbol from the set of replacement symbols that corresponds to the subset of game symbol positions containing the first one of the game symbol display positions in which the special symbol was displayed to provide a modified outcome;

shifting remaining ones of the replacement symbols in the ordered set of replacement symbol display positions, other than the first replacement symbol, towards the exit position and inserting a new replacement symbol at the entry position; and granting an award to a player for any winning combination of symbols in the modified outcome including any replacement symbols that substituted for the special symbols.

2. The method of claim 1, wherein displaying the replacement symbols comprises displaying a row of the replacement symbols on the display system, wherein a number of replacement symbols in the row equals a number of the subsets of game symbol display positions.

3. The method of claim 1, further comprising removing the replacement symbol displayed at the exit position if the replacement symbol displayed at the exit position is not used to replace a game symbol in the subset of game symbol display positions corresponding to the exit position.

4. The method of claim 1, further comprising removing at least one of the replacement symbols from the set of replacement symbols and adding a new replacement symbol to the set of replacement symbols for each game so the player is guaranteed to see a new set of replacement symbols for each game.

5. The method of claim 1, wherein the replacement symbols are pseudo-randomly selected for inclusion in the set using weighted probabilities.

6. The method of claim 1, wherein the replacement symbols include wild symbols and award multiplier symbols.

7. The method of claim 1, wherein there is at least one special symbol displayed in each subset of game symbol display positions.

8. The method of claim 1, further comprising receiving a wager by the player, wherein the wager is one of a variety of possible wagers for playing a single game, wherein there is a different set of replacement symbols displayed for each wager amount.

9. The method of claim 1, wherein the display system comprises a main display and a secondary display, wherein the plurality of game symbols are displayed on the main display and the set of replacement symbols are displayed on the secondary display.

10. The method of claim 1, wherein each subset of game symbol display positions comprises a virtual reel of game symbol display positions.

11. A video gaming device comprising:

a display system;

an acceptor, and a programmed processor system;

wherein the processor system comprises machine-readable instructions that, when executed by the processor system:

cause the display system to display a plurality of game symbols at a plurality of game symbol display positions to form an outcome, wherein the plurality of game symbols are randomly determined, wherein the game symbol display positions comprise a plurality of subsets of game symbol display positions, and wherein the plurality of game symbols comprise a special symbol displayed in a first one of the game symbol display positions;

cause the display system to display a set of replacement symbols concurrently with and separate from the plurality of game symbols, the set of replacement symbols being randomly determined and comprising a plurality of different replacement symbols arranged in an ordered set of replacement symbol display positions, wherein the ordered set of replacement symbol display positions includes an entry position and an exit position, and wherein each of the plurality of subsets of game symbol display positions is associated with a corresponding replacement symbol display position;

cause the processor system to substitute the special symbol displayed on the outcome with a first replacement symbol from the set of replacement symbols that corresponds to the subset of game symbol positions containing the first one of the game symbol display positions in which the special symbol was displayed to provide a modified outcome;

cause the processor system to shift remaining ones of the replacement symbols in the ordered set of replacement symbol display positions, other than the first replacement symbol, towards the exit position and inserting a new replacement symbol at the entry position; and cause the processor system to grant an award to a player for any winning combination of symbols in the modified outcome including any replacement symbols that substituted for the special symbols.

12. The video gaming device of claim 11, wherein displaying the replacement symbols comprises displaying a row of the replacement symbols on the display system, wherein a number of replacement symbols in the row equals a number of the subsets of game symbol display positions.

13. The video gaming device of claim 11, further comprising machine-readable instructions that, when executed by the processor system, remove the replacement symbol displayed at the exit position if the replacement symbol displayed at the exit position is not used to replace a game symbol in the subset of game symbol display positions corresponding to the exit position.

14. The video gaming device of claim 11, further comprising machine-readable instructions that, when executed by the processor system, remove one of the replacement symbols from the set of replacement symbols and adding a new replacement symbol to the set of replacement symbols for each game so the player is guaranteed to see a new set of replacement symbols for each game.

15. The video gaming device of claim 11, wherein the replacement symbols are pseudo-randomly selected for inclusion in the set using weighted probabilities.

16. The video gaming device of claim 11, wherein the replacement symbols include wild symbols and award multiplier symbols.

17. The video gaming device of claim 11, wherein, for each subset of game symbol display positions, a special symbol displayed in one of the subset of game symbol display positions.

18. The video gaming device of claim 11, further comprising machine-readable instructions that, when executed by the processor system, receive a wager by the player, wherein the wager is one of a variety of possible wagers for playing a single game, wherein there is a different set of replacement symbols displayed for each wager amount.

19. The video gaming device of claim 11, wherein the display system comprises a main display and a secondary display, wherein the plurality of game symbols are displayed on the main display and the set of replacement symbols are displayed on the secondary display.

20. The video gaming device of claim 11, wherein each subset of game symbol display positions comprises a virtual reel of game symbol display positions.

* * * * *